UNITED STATES PATENT OFFICE.

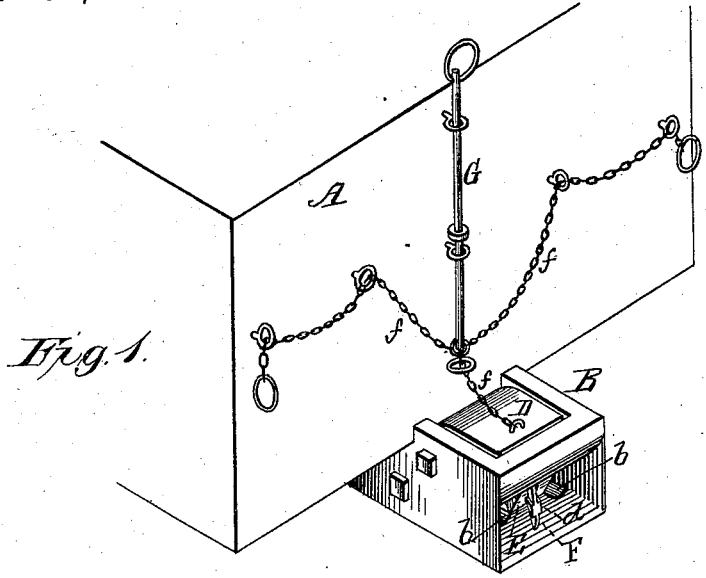
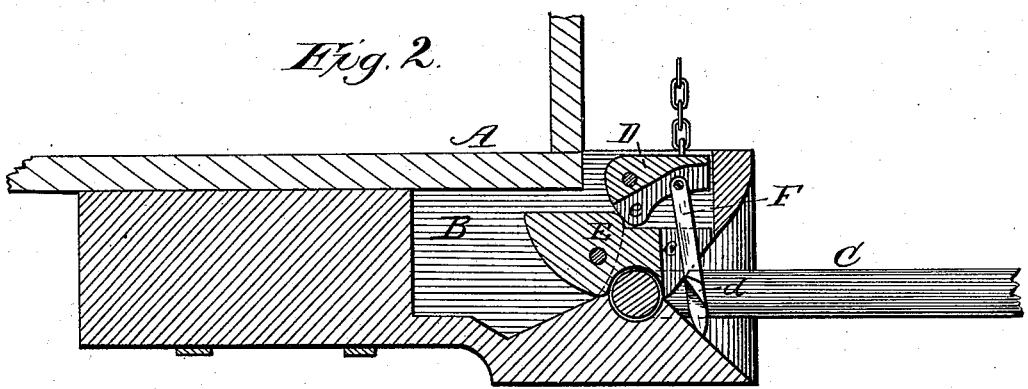
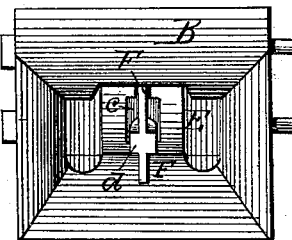
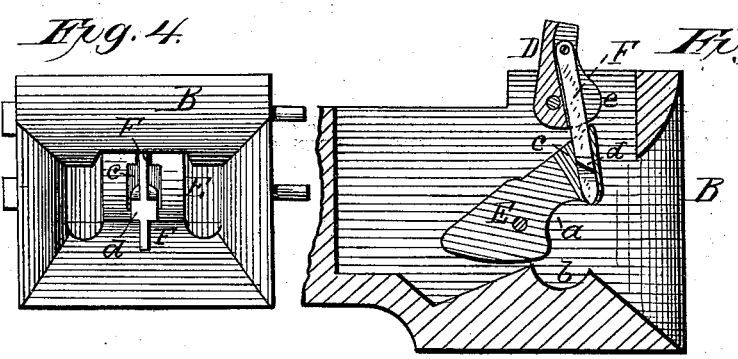

GEORGE T. OSBORNE, OF ATLANTA, GEORGIA.

CAR-COUPLING.

SPECIFICATION forming part of Letters Patent No. 253,885, dated February 21, 1882.

Application filed December 10, 1881. (No model.)

*To all whom it may concern:*

Be it known that I, GEORGE THOMAS OSBORNE, a citizen of the United States, residing at Atlanta, in the county of Fulton and State of Georgia, have invented certain new and useful Improvements in Car-Couplings; and I do hereby declare that the following is a full, clear, and exact description of the same, reference being had to the annexed drawings, making a part of this specification, and to the letters and figures of reference marked thereon.

Figure 1 of the drawings is a perspective view of my invention, showing it applied to the end of a car, and means employed for uncoupling or raising the pivoted latch or dog of the draw-head. Fig. 2 is a longitudinal section, showing the coupling-link engaged or connected to the draw-head. Fig. 3 is a similar view, showing the coupling device in an elevated position, ready for coupling; and Fig. 4 is a front elevation of my invention.

The present invention has relation to certain new and useful improvements in that class of car-couplings in which the draw-head has pivoted to it a falling latch hook or like means, whereby the device is self-coupling.

The invention consists in certain details of construction, substantially as shown in the drawings, and hereinafter described.

In the accompanying drawings, A represents the end of a freight, passenger, or other car having suitably connected thereto the draw-head B, for receiving the usual coupling-link, C. The draw-head is open on its upper side to admit of the operation or raising of a gravitating jaw, D, pivoted to the sides of the draw-head in any suitable manner.

Below the jaw D is a gravitating hook, E, which is also pivoted to the draw-head, having its pivotal point away from that of the jaw D, or, in other words, not on the same vertical line.

The under side of the coupling-hook E has a semicircular recess, a, which, when the link C is coupled to the draw-head B, fits down over the same, and a similarly-formed recess, b, is provided in the draw-head, so that the end of the link will fit between the two when the link is coupled, as shown in Fig. 2.

To the jaw D is pivoted the upper end of a dog, F, which passes down through an open slot, c, in the coupling-hook E, and when the jaw D is elevated, the shoulders d on the dog catch against the coupling-hook and raise it from contact with the link C. When the jaw D is down the projection e rests upon the upper side of the coupling-hook E, and the lower end of the dog F rests upon the draw-head.

I do not desire to confine my invention to any special form of the jaw D, coupling-hook E, or dog F, as they are susceptible of change or modification without departing from the principle of my invention, it being sufficient if they be of such construction as will admit of their combined operation for the purpose and in the manner hereinbefore described, and therefore it is deemed unnecessary to go into the detailed description of the exact form of the parts.

As a means of elevating the jaw D when required in uncoupling the draw-heads or link, a chain, *f*, is connected to the jaw, and extends to both sides of the car in convenient reach of the brakeman standing on the platform, whereby the jaw D may be raised from either side, as found most convenient.

An upright rod, G, is connected at its lower end to the chain *f*, directly over the jaw D, and extends up to the top or roof of the car, its purpose being to carry the chains or chain back to position when the coupling is locked, and by means of which the coupling can be unlocked from the top of the car. When the car is being coupled the jaw D is drawn down and with it the dog F, which allows the coupling-hook E to come down upon and over the link C, firmly holding it to the draw-head.

Having now fully described my invention, what I claim as new, and desire to secure by Letters Patent, is—

1. In a car-coupling, the combination, with the draw-head thereof, of the pivoted jaw D and pivoted hook E, said jaw having pivoted thereto a suitable dog, F, substantially as and for the purpose set forth.

2. In a car-coupling, the combination, with the pivoted hook E, constructed as described, of the pivoted jaw D, carrying pivoted dog F, with shoulders $d$, substantially as and for the purpose specified.

3. In a car-coupler, the combination, with the pivoted jaw D and hook E, of the chains $f$, or other suitable connection, and the upright rod G, secured thereto, substantially as and for the purpose set forth.

In testimony that I claim the above I have hereunto subscribed my name in the presence of two witnesses.

G. THOS. OSBORNE.

Witnesses:
J. H. SIMONS,
A. M. REINHARDT.